Patented Jan. 14, 1930

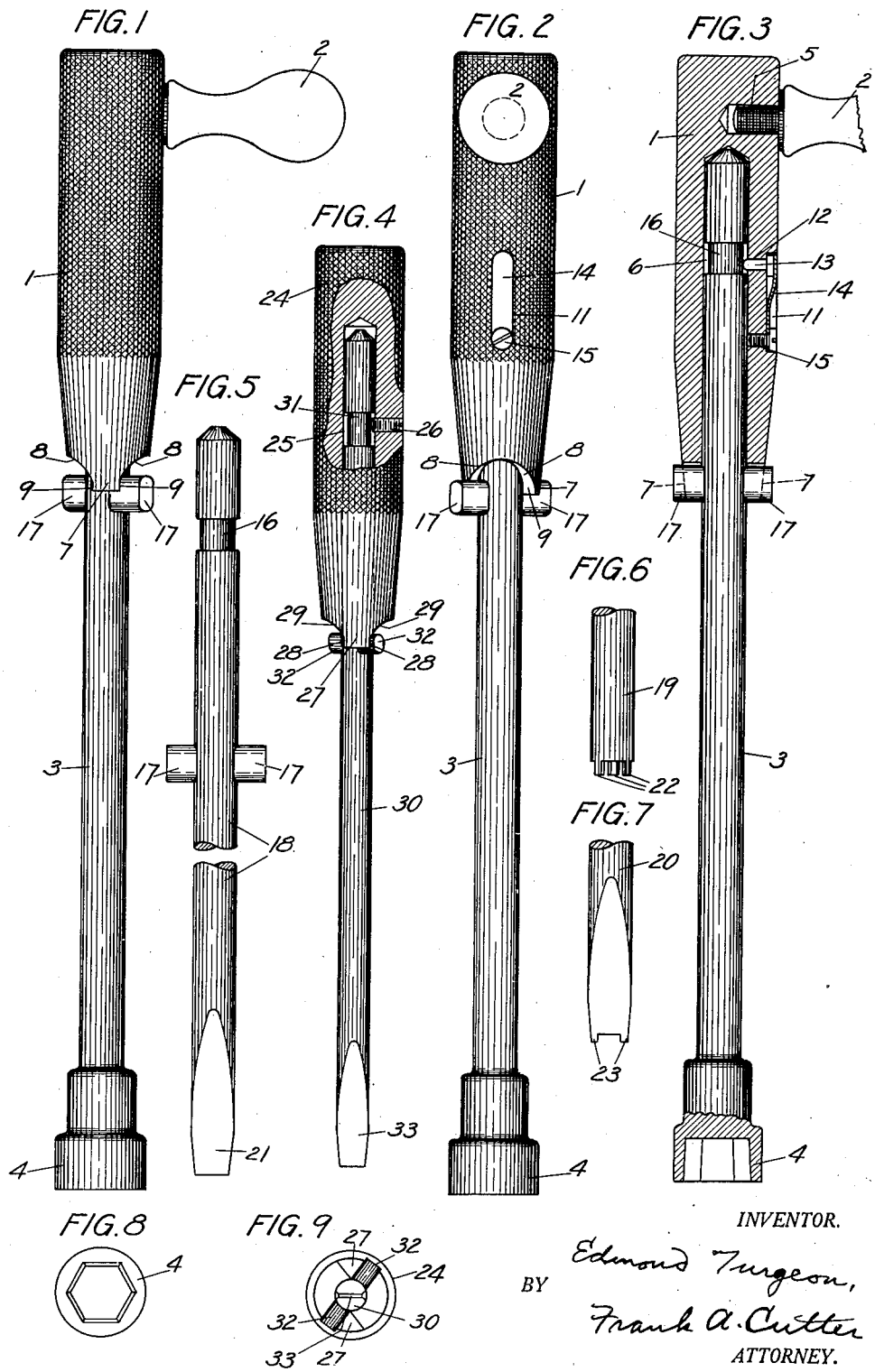
Jan. 14, 1930. E. TURGEON 1,743,505
SEATING AND UNSEATING TOOL
Filed Jan. 8, 1929

1,743,505

UNITED STATES PATENT OFFICE

EDMOND TURGEON, OF THOMPSONVILLE, CONNECTICUT

SEATING AND UNSEATING TOOL

Application filed January 8, 1929. Serial No. 331,033.

My invention relates to improvements in hand-operated seating and unseating tools in which an object-engaging shank is operated by a handle in the form of a driver, a plurality of shanks adapted for different objects generally being provided for each driver; and the objects of my improvement are, first, to produce a strong and powerful tool for seating or tightening and unseating or loosening bolts, nuts, and screws, removing broken screws, drills, and taps, and acting in a generally similar manner on various other objects, which tool is simple in construction and operation, durable, and withal highly efficient and entirely practical; second, to provide said tool with convenient means for changing the several shanks required to engage different kinds of objects; and, third, to produce a tool of this character that can be used in a generally similar manner as a screw-driver, or a socket-wrench, or a cold-chisel.

It frequently occurs that nuts and the heads of bolts become so badly mutilated as to render it impossible to apply a wrench successfully thereto, the heads of screws are damaged and the slots therein closed, thus making it impossible to remove such screws with an ordinary screw-driver, and screws, drills, and taps break off, leaving portions thereof firmly set in the work. Great difficulty has heretofore been experienced in removing all such mutilated and broken objects, as is well understood, but with this tool I am able to do such work with the utmost facility. Even when the broken screw is too hard to enable a slot to be cut therein with a cold-chisel, the same in most cases has on the broken end more or less unevenness which makes it possible to unscrew the object with my tool.

Other objects and advantages will appear in the course of the following description.

I attain the objects and secure the advantages of my invention by the means illustrated in the accompanying drawings, in which—

Figure 1 is a side elevation of a seating and unseating tool which embodies a practical form of my invention, a socket-wrench shank being in place in the driver, and the latter being in position relative to said shank to enable said tool to be employed as a wrench, or disposed ready to impart to said shank a partial revolution to the left; Fig. 2, a side elevation of said tool as viewed from the right of Fig. 1, with the driver and shank relatively disposed as in the first view; Fig. 3, a longitudinal section through said tool, showing the relative positions of the parts after the aforesaid partial revolution has been imparted; Fig. 4, a side elevation in partial section of a slightly modified form of the tool; Fig. 5, a side elevation of the screw-driver or cold-chisel shank that can be substituted for the socket-wrench shank, the intermediate portion being broken out; Fig. 6, a side elevation of the object-engaging terminal portion of a tap shank; Fig. 7, a similar elevation of a drill shank; Fig. 8, a bottom plan of the socket-wrench shank, and, Fig. 9, a bottom plan of the Fig. 4 tool.

A screw-driver shank is shown in place in the driver in Fig. 4, and the relationship of these members is similar to the relationship of corresponding members in Figs. 1 and 2.

Similar reference characters designate similar parts throughout the several views.

The tool, as illustrated in Figs. 1, 2, 3, and 8, comprises a driver 1 provided with a laterally-extending, removable handle 2, and a shank 3 the lower or outer terminal of which is in the form of a socket-wrench 4. The inner sides of the socket-wrench or socket 4 taper or incline from the open end of the member upwardly and inwardly to enable said member to be forced tightly into contact with a nut or bolt head having worn corners or being otherwise mutilated. This socket-wrench is for a hexagonal head or nut. Other socket-wrench shanks for different kinds and sizes of nuts and heads may be provided.

The handle 2 is furnished for the purpose of affording additional gripping means, and preferably is removable because not always needed. In this case the handle 2 has a short shank 5 which is tapped into one side and near the top of the driver 1.

There is a central longitudinal bore 6 in the driver 1 to receive the upper-terminal portion of the shank 3. This bore or passage opens through the bottom of the driver, and is closed at the inner or upper end.

Two oppositely-disposed lugs 7 are formed in the lower end of the driver 1. Each of these lugs has flaring edges or edges which from below extend upwardly and outwardly, or divergently, except that preferably the lower portions of such edges are parallel, the flaring parts being represented at 8—8, and the parallel parts at 9—9.

In one side of the driver 1 is a longitudinal slot 11, and said slot near the upper end communicates with the bore 6 through a radial opening 12 in said driver. A pin 13 is located in the opening 12 with the head of said pin in the slot 11. The inner end of the pin 13 is convex, and said pin is normally retained with said end in the bore 6 by means of a flat spring 14 in the slot 11. The spring 14 is held in place by a screw 15 passing through said spring near the lower end thereof and tapped into the driver. The upper terminal of the spring 14 bears on the head of the pin 13.

The shank 3 has an annular groove 16 therein a little distance below the top of said shank, and normally the pin 13 is held by the spring 14 with the inner end of said pin in said groove, assuming that the shank be in place in the driver. Means are thus provided for locating or enabling to be located the shank 3 in initial position, and also for the purpose of preventing said shank from dropping out of the driver 1, on the one hand, and to permit said shank to be forced into place in and forcibly withdrawn from said driver, on the other hand, the pin 13 being actuated outwardly, against the resiliency of the spring 14, in either of the latter cases. The groove 16 is of sufficient width to enable the inner end of the bore 6 to bear against the inner end of the shank 3, and to permit sufficient movement of the members to separate said ends the required distance to locate said shank in initial position, without forcing the inner end of the pin 13 out of said groove.

Projecting from opposite sides of the shank 3 are two lugs 17. These lugs are so shaped and positioned on the shank 3 that, when said shank is down with the upper edge of the groove 16 resting on the pin 13, the upper parts of said lugs are located between the parallel parts 9 of the lugs 7. This is the initial position of the members, and when they are so disposed the tool can be used as an ordinary wrench for screwing a bolt in or out, or a nut on or off, as the case may be.

When the driver 1 is rotated to the right the leading parts 9 of the lugs 7 engage the following sides of the lugs 17 and the shank 3 is rotated or partially rotated in the same direction; and when said driver is rotated to the left the leading parts 9 of said first-named lugs engage the following sides of said second-named lugs and said shank is rotated or partially rotated to the left. In either of these operations the socket 4 is, of course, placed over the bolt head or nut operated on.

To tightly seat a bolt or nut having a right-hand thread, first place the socket 4 over such head or nut, position the driver 1 with the leading, in the right-hand direction of rotation, parts 9 of the lug 7 against the following sides of the lugs 17, and then strike a sharp blow with a hammer on the head of said driver. The driver being held in the hand at this time does not rotate but does descend until the inner end of the bore 6 comes to rest on the inner end of the shank 3, and in descending the leading parts 8 force the lugs 17 around to the right, said lugs carry with them in the same direction said shank with the socket 4, and the latter imparts a partial revolution to the bolt head or nut engaged thereby. The setting up operation may be repeated, although usually no repetition is necessary.

The unseating operation is similar to the seating operation, except that, for a bolt or nut having a right-hand thread as before, the opposite parts 9 and 8 and the opposite sides of the lugs 17, are involved, that is to say, the sides opposite to the corresponding sides involved in the setting up operation, and, if the bolt head or nut be mutilated, it is necessary, after placing the socket 4 on such head or nut, to permit the driver 1 to descend onto the top of the shank 3, and with a hammer applied to the top of said driver force said socket tightly into engagement with the head or nut.

In place of the socket-wrench shank 3 there may be used, with the driver 1, numerous other types of shanks, such as, for examples, a screw-driver shank 18, a tap shank 19, and a drill shank 20.

The shank 18 differs from the shank 3 only in that the former has formed at the bottom or outer terminal a blade 21 to enter the slot in the head of a screw. The operations of the tool, when the same includes the shank 18, for tightening and loosening and removing screws will be understood from the foregoing explanation of the operations of the tool when it includes the shank 3.

The shank 18 may be converted into a cold-chisel by sharpening the bottom edge of the blade, and with it closed screw slots can be opened, and slots may be cut, by applying the blade to the slotted part of the screw, or to the part where it is desired to cut a slot, lowering the driver onto the shank, and striking the head of said driver with a hammer. Then, with the blade in the slot, the screw is forced out with the aid of the lugs 7 and 17 and the hammer.

The shank 19 has at the bottom end three projections 22 to enter the spaces between the threads of a tap, and the shank 20 has at the bottom end two projections 23 to enter the spaces between the cutting parts of a drill. The shanks 19 and 20 above their lower terminals are similar to the shank 3 above its lower terminal.

In Figs. 4 and 9 a smaller and lighter (in weight) tool is shown. Here are present a driver 24 without a handle, within said driver is a bore 25, a screw 26 is substituted for the spring-pressed pin, there are two lugs 27 with parallel parts 28—28 and flaring parts 29—29, a screw-driver shank 30 having therein a groove 31 to receive the inner end of said screw, and a pin passed transversely through said shank to project on opposite sides thereof and provide two lugs 32. The shank 30 has a blade 33. Except in the particulars noted, there is no essential difference between the two tools. Other types of shanks may be provided as elements in the smaller and lighter tool. In this example the screw 26 must be turned outwardly before the shank can be removed from the driver, and inwardly to hold said shank in place therein. There is practically no difference in operation as between the two tools.

The spring-pressed latch pin might be substituted for the screw 26, and vice versa; and the lug-forming pin might be used for the lugs 17, and vice versa.

In using this tool, whether the same be large or small, and regardless of the particular kind or type of tool shank at the time connected with the tool driver, no difficulty is experienced in holding with the hand said driver against rotation when struck with the hammer. The driver descends under the force of the blow, however, and, through the medium of the driver lugs and the shank lugs, transmits the greater amount of said force to the shank and through that to the object engaged by the shank. The driver, in descending straight downwardly or approximately so, exerts with two opositely disposed inclined or flaring edges of its lugs a wedging action on two oppositely disposed sides of the shank lugs, well balanced, and placed and exerted to the best advantage, which is well nigh irresistible. The driver lugs embrace and slide on the shank in each case, and the stability and power of the tool when in more or less violent action are thereby enhanced.

The tool is as applicable to left-hand threaded objects as to right-hand threaded objects.

It is to be understood that a considerable number of shanks, which differ in shape and size, are or may be available with my driver; that all possible applications and manners of operation of the tool are not herein set forth; and that more or less change in the shape, size, construction, and arrangement of some or all of the parts of the tool, in addition to those hereinbefore pointed out or mentioned, may be made without departing from the spirit of my invention, or exceeding the scope of what is claimed.

I claim:

1. A tool of the class described comprising in combination, a shank for engaging an object with its lower end, a driver having a recess for receiving the upper end of said shank so that said shank and driver are relatively rotable and reciprocable, a lug on said shank, a cam on the lower end of said driver for acting on said lug to rotate said shank relative to said driver which is formed in the end of the driver by the wall of the recess therein the mouth of which extends peripherally as far as the cam does.

2. A tool of the class described comprising in combination, a shank for engaging an object with its lower end, a driver having a longitudinally disposed bore for slidably and rotatably receiving the upper end of said shank, a lug extending radially of said shank, unopposed cams at the lower end of said driver which extend upwardly in opposite directions from spaced points and are joined together at their upper portions, the said lug and cams being arranged so that the upper end of said shank may abut the end of said bore, while the lug is out of contact with the upper joined together cam portions whereby when pressure is applied to the driver said pressure may be imparted to the shank independently of the lug and cams.

3. A tool of the class described comprising in combination, a driver having a bore extending from the lower end thereof and terminating adjacent its upper end, a shank for engaging an object having its upper end slidable and rotatable in said driver, a lug radially of said shank, a pair of lugs at the end of said driver at either side of said lug of the shank to limit the relative rotative movement of said shank and driver, a recess in the end of said driver the walls of which form an unopposed cam surface for engaging the lug of the shank, the said cam surface extending from the lugs of the driver upwardly and inwardly whereby when engaging the lug of the shank as the shank and driver are moved longitudinally of one another the shank and driver are rotated relative to one another.

EDMOND TURGEON.